(No Model.)

O. D. WRIGHT.
DEVICE FOR SECURING ANIMAL TRAPS.

No. 364,390. Patented June 7, 1887.

WITNESSES:
A. F. Walz
C. Bendixon

INVENTOR
Orrin D. Wright
BY
Duell, Laass & Duell
ATTORNEYS.

UNITED STATES PATENT OFFICE.

ORRIN D. WRIGHT, OF COMMUNITY, NEW YORK, ASSIGNOR TO THE ONEIDA COMMUNITY, (LIMITED,) OF SAME PLACE.

DEVICE FOR SECURING ANIMAL-TRAPS.

SPECIFICATION forming part of Letters Patent No. 364,390, dated June 7, 1887.

Application filed May 2, 1887. Serial No. 236,799. (No model.)

*To all whom it may concern:*

Be it known that I, ORRIN D. WRIGHT, of Community, in the county of Madison, in the State of New York, have invented new and useful Improvements in Chains for Holding Animal-Traps, of which the following, taken in connection with the accompanying drawings, is a full, clear, and exact description.

Animal-traps have generally connected to them a chain by which to fasten the trap to a stationary object, said chain being provided with a ring designed to be slipped over a stake driven into the ground, and with a wedge or anchoring-pin adapted to be driven into a log or a tree. The attachment of said ring and wedge to the chain has heretofore required a special link, and the wedge necessarily had to be formed with a slot or an eye by which it was hung on the said link.

The object of my invention is to provide simpler, cheaper, and more convenient means for securing the trap-chain to a log or tree or stake or analogous object; and to that end the invention consists, essentially, in forming the ring and wedge in one piece, as hereinafter more fully described, and specifically set forth in the claims.

Figure 3:
Figure 2:
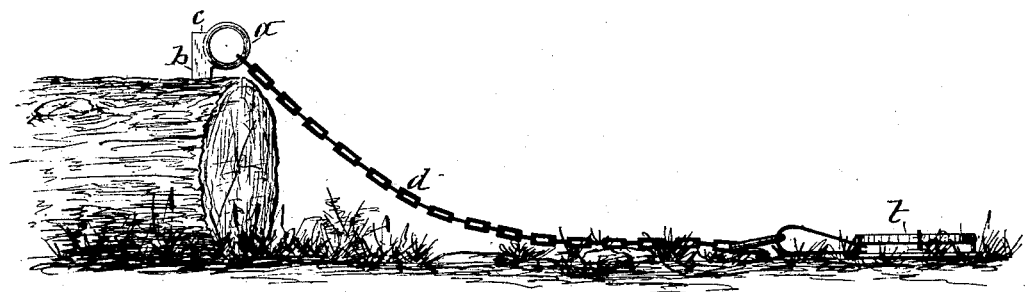
Figure 1:
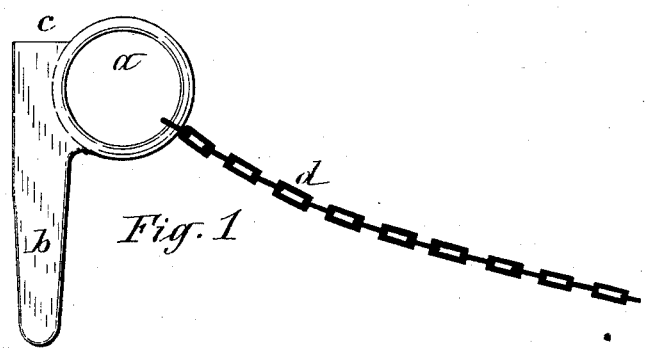

The invention is fully illustrated in the annexed drawings, wherein Figure 1 is a plan view of the combined hook and wedge. Figs. 2 and 3 show the device attached to a log and to a stake, respectively.

*a* denotes the ring, and *b* the wedge, both of which I cast or form in one piece, and in such a manner as to cause the wedge to extend tangentially from the ring and present at the end adjacent to the ring a shoulder or head, *c*, upon which to strike in driving the wedge into the log, as represented in Fig. 2 of the drawings, and in this latter operation the ring serves as a handle by which to hold the wedge while driving it, thus obviating the danger of pounding on the operator's fingers.

The tangential arrangement of the wedge on the ring produces a prolonged and firm attachment between said parts. The ring *a* is of a diameter to allow it to receive through it a stake driven into the ground, and of sufficient strength to hold the trap with the caught animal jerking thereon. Fig. 3 of the drawings illustrates this application of the ring.

*d* represents the chain, which is at one end connected to the ring *a* and at the opposite end to the animal-trap *t*.

It will be observed that, aside from the advantages already stated, I dispense with the usual extra-long link for the attachment of the separate ring and wedge to the chain, and a single attachment unites said parts; and, furthermore, the union of the ring and wedge improves increased strength to both.

Having described my invention, what I claim as new, and desire to secure by Letters Patent, is—

1. The improved trap chain fastener, consisting of the ring *a* and wedge *b*, formed in one piece, with the wedge extending tangentially from the ring, as set forth.

2. The ring *a* and wedge *b*, formed in one piece, said wedge extending tangentially from the ring and being provided with the shoulder or head *c*, substantially as described and shown.

In testimony whereof I have hereunto signed my name and affixed my seal, in the presence of two attesting witnesses, at Community, in the county of Madison, in the State of New York, this 25th day of April, 1887.

ORRIN D. WRIGHT. [L. S.]

Witnesses:
  VICTOR C. NOYES,
  WM. A. HINDS.